UNITED STATES PATENT OFFICE.

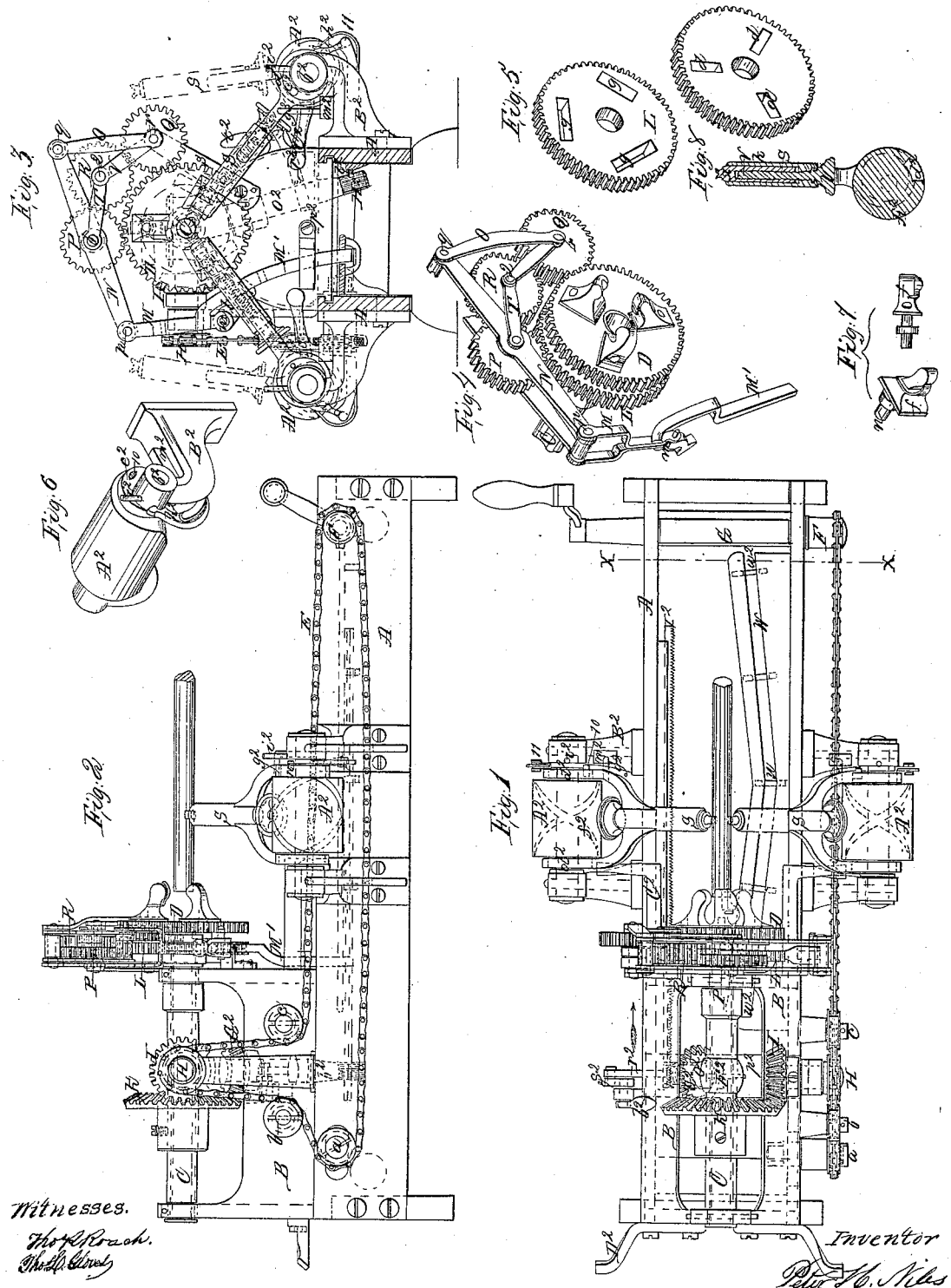

PETER H. NILES, OF BOSTON, MASSACHUSETTS.

LATHE FOR TURNING MASTS, &c.

Specification of Letters Patent No. 22,447, dated December 28, 1858.

*To all whom it may concern:*

Be it known that I, PETER H. NILES, of Boston, in the county of Suffolk and State of Massachusetts, have invented a new and Improved Machine for Turning Masts and Spars, of which the following is a full, clear, and exact description, reference being had to the accompanying drawings, making part of this specification, in which—

Figure 1, is a plan—Fig. 2 a side view—Fig. 3 a section upon the line X, X, of Fig. 1; Fig. 4 detached view of the apparatus which regulates the action of the cutters; Fig. 5, detached view of the wheels L and D; Fig. 6, detached view of one of the cylinders which operate the dogs and the arms which support it; Fig. 7 detached view of one of the cutters and cutter blocks; Fig. 8, section through one of the dogs S.

The process by which the masts and spars for vessels and other similar bulky articles of wood are at present prepared is both tedious and expensive and it has not thus far been found practicable to turn them by machinery, on account of their great length and weight which have caused them to sag when supported at their extremities only, and it has not been found practicable to support a revolving log along its entire length.

To remedy this difficulty and for the purpose of preparing masts and spars by a much more economical and expeditious process than that heretofore adopted I have invented a machine in which the stick of timber is held stationary being dogged rigidly to the machine, and in which the cutters traverse from end to end and revolve around the stick, the dogs being so arranged that they may be moved out of the way of the cutters as they aproach and returned again to their duty after the cutters have passed; their motions being governed either automatically by the machine itself or by the attendant having the machine in charge.

To enable others skilled in the art to build and use my machine I will proceed to describe its construction and operation.

The operating parts of the machine are carried by a strong frame work A, of iron or of timber upon which slides the cutter carriage B. Upon the top of this carriage revolves a hollow shaft C, that carries the cutters, and through which the mast or spar passes.

I will first describe the manner in which the cutters are set and operated.

An endless chain E, passes around a chain pinion F, upon the driving shaft G, and around guide pulleys $a$, $b$, $c$, the former being upon the frame work and the latter upon the carriage; the chain also passes around a chain pinion H, upon a short shaft which carries a bevel wheel I, this wheel engages with a wheel K, upon the cutter shaft C, to one end of which is secured the cutter wheel D, to which the cutters are attached, in the following manner: $d$, are radial slots in the wheel D, through which pass the pins $c$, that enter the blocks $f$, (Fig. 7) to which the cutters are attached, the heads or rings $i$ being larger than the slots $d$, the cutter blocks are held fast upon the wheel D, but not so tightly that they cannot move easily to and from the center of the wheel, the pins $e$, sliding freely in the radial slots. The cutters are thus allowed to move to and from the center for the purpose of varying the diameter of a spar or other article to be turned at different points as may be required, and their motion is governed in the following manner: Immediately back of the wheel D, is a similar wheel L, having slots $g$ into which pass the prolongation $n$, of the pins $e$, the slots being so cut as seen in the drawings, that when the wheels D and L, are in place and are revolved one way or the other with respect to each other the cutters shall be moved to or from the center. It has been stated that the wheel L runs freely upon the cutter shaft. It is caused to revolve with this shaft in the following manner:

M, N, O, are arms which are pivoted to each other at $p$ and $q$, the arms M and O, being pivoted at $m$, and $r$, to stationary brackets or supports $l$, and $s$, projecting from the carriage. The arm N carries a gear P, which engages with the wheel L, and upon the stationary pivot $r$ revolves another gear Q of an equal diameter and number of teeth with the gear P, and which engages with the wheel D. The jointed arms T, V, the one pivoted at $r$, and the other to the center of motion of the wheel P, at $t$, carry at their common point (2) an intermediate gear R, which engages with both the wheels P and Q, when the parts are thus arranged it is evident that the motion of the wheel D, will be imparted to the wheel L, the two revolving in the same direction, and so long as the arms M, N, O, remain stationary the two wheels (D, and L,) will be revolved with an equal velocity, and the cutters will revolve at an unvarying distance from their center of motion. If however the position of the wheels D, and L, be changed with respect to each other, causing the gear P to approach the gear Q or to recede from it, the cutters will be moved to or from their center of motion a distance proportionate to the motion of the wheel P. This motion of the wheel P, is effected as follows: The arm M, projects down below its pivot $m$, at M′, and enters a pattern slot W, (Fig. 1,) upon the frame work, and thus as the carriage traverses from end to end of the frame work the points $p$ and $q$, are revolved round the centers $m$, and $r$, and the gear P is caused to aproach or recede from the gear Q, the gear R, remaining constantly engaged with them both. When the arm M′ is at $w$, in the pattern slot, the cutters will be at their greatest distance apart and when this arm is at $w^2$ the cutters will be at their least distance apart. The position of the cutters is thus caused to vary in accordance with the shape or inclination of the pattern W.

The timber to be turned is supported along its whole length at suitable distances apart by dogs, S, which are constructed and operated as follows. The shank $x$, of the dog slides freely in and out of a cylinder $k$, which forms its case and is operated by a screw $v$, turned by a hand nut or wheel U, the shank $x$, is prevented from revolving by a pin and groove in a well known and customary manner, and the screw $v$, is prevented from moving longitudinally while it is allowed to revolve freely, and thus by turning the hand nut U, the dog is protruded more or less from its case K for the purpose of adjustment.

A metallic cylinder $A^2$ (Fig. 6) revolves upon concentric bearings $b^2$ in arms $B^2$ projecting from the frame work A. This cylinder also carries at both extremities eccentrics $c^2$ upon which fit the rings $d^2$ (Figs. 3 and 8) upon the lower extremity of the arms which support the case K. If now when the parts are in place the cylinder $A^2$ be turned upon its bearings, the dogs will be advanced toward the stick of timber or drawn back from it. This motion of the cylinder is effected in the following manner.

An arm $C^2$ attached to the end of the carriage B projects over the edge of the frame A (Fig. 1) and as the carriage is moved along in the direction of its arrow, the outer end of this arm enters the spiral groove $f^2$ in the cylinder $A^2$ and by revolving the cylinder first retracts and then raises the dog S into the position shown dotted in Fig. 3, out of the way of the carriage, when thus raised a bent pin $g^2$ attached to one of the arms of the case K strikes against a pin $v^2$ on the top of the arm $B^2$, this prevents the dog from being thrown back too far and to prevent its again falling forward when the arm $C^2$ has left the groove in the cylinder $A^2$. A pin 10 in the end of the cylinder is caught by a spring pawl $h^2$ pivoted at 11 to a piece projecting from the arm $B^2$. The dog S, is thus held up out of the way of the carriage B until it has passed the part of the frame to which the dog is attached, the dog is then brought down again to support the spar, by the movement of the carriage as it passes on, the end of a bent arm $D^2$ attached to the rear end of the carriage enters another spiral groove $l^2$ in the cylinder $A^2$ which is cut counter to the groove $f^2$ and revolves the cylinder toward the path of the carriage, this throws down the dog S, until the bent pin $g^2$ strikes on a block $m^2$ on the top of the arm $B^2$ and prevents the farther descent of the dog. But as this takes place before the arm $D^2$ has left the groove $l^2$, the cylinder is revolved a little farther and the eccentrics $c^2$ on the ends of it turning in the rings $d^2$, project the dog toward the center of the spar and give it the required support.

The dogs S, are arranged in pairs at suitable distances along the sides of the frame A outside of the path of the carriage B, and in the manner above described are raised out of the way of the carriage by the arms $C^2$ and after the carriage has passed by are again brought down and caused to support the spar by the arms $D^2$, as they pass. Under certain circumstances it is my intention to place these dogs wholly or in part under the control of the attendant, and either to operate them entirely by hand, or partly by hand and partly by the machine itself. For instance they may be made to rise automatically out of the way of the revolving cutters, as they advance toward them and be restored to their position against the log after the cutters have passed by the attendant, or they may be thrown up by the attendant and be restored by him again; but in such case great care would be required that the cutters be raised in time to avoid the advancing cutters, or the machine might be provided with a stop motion that should arrest its operation, whenever the cutters approach too near to one of the dogs.

The carriage B is caused to traverse longitudinally on the frame A on suitable ways in the following manner—a sleeve $F^2$ is hung loosely on the shaft C, to it is hung by means of a collar a shaft $o^2$ (dotted in Figs. 2 and 3) which is steadied in a slot in a cross brace $p^2$ of the carriage; this shaft carries a beveled cog wheel G² which engages with the wheel K and at its lower end a pinion H². A rod r² connected by a sleeve with the shaft o² passes through the side of the carriage and is pivoted at its outer end to a crank s² on a short shaft which is supported in a standard projecting from the side of the carriage; a handle t² serves to vibrate the crank s² and throw the pinion H² into or out of gear with a rack I² on the side of the frame A. When thus engaged the revolutions of the shaft C, cause the carriage to travel along the frame A.

With such an arrangement of machinery as I have hereinabove described a spar or similar article of any dimensions consistent with the capacity of the machine may be turned to any given taper according to the pattern employed.

Thus far I have spoken of my machine as particularly applicable to turning masts and spars, it is obvious however that it is equally applicable to turning other bulky articles of a tapering or irregular form such as architectural columns or pillars. I do not therefore limit myself to the turning of masts and spars alone, but intend to employ my improvements wherever they may be found to be applicable.

What I claim as my invention and desire to secure by Letters Patent as an improvement in machines for turning masts and spars is—

1. The revolving traversing cutters in combination with the dogs S or their equivalents for supporting the stick of timber, operating in the manner described for the purpose set forth.

2. I claim raising the dogs automatically as the cutters approach them for the purpose set forth.

3. I claim the method of controlling the position of the cutters by means of the combination of the slotted wheels D and L the gears P Q and R and the pattern W and their connections M M' N O T V operating in the manner substantially as set forth.

PETER H. NILES.

Witnesses:
　Thos. R. Roach,
　P. E. Teschemacher.